(12) United States Patent
Gilzean et al.

(10) Patent No.: US 7,778,629 B2
(45) Date of Patent: Aug. 17, 2010

(54) METHOD AND SYSTEM FOR HANDLING POTENTIALLY CONTENTIOUS SITUATIONS UPON RECEIPT OF AN AUTOMATICALLY CONNECTING SMS MESSAGE

(75) Inventors: Candice B. Gilzean, Cedar Park, TX (US); Gahlya Gregory, Bowling Green, KY (US); Fabian F. Morgan, Austin, TX (US); Michael Eric Rhodes, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 11/621,832

(22) Filed: Jan. 10, 2007

(65) Prior Publication Data

US 2008/0167005 A1 Jul. 10, 2008

(51) Int. Cl.
*H04W 4/00* (2009.01)
*H04L 12/16* (2006.01)

(52) U.S. Cl. .............. 455/416; 455/466; 455/414.1; 370/260; 370/261; 370/262; 379/202.01

(58) Field of Classification Search ......... 370/260–262; 379/202.01; 455/416, 466, 414.1
See application file for complete search history.

(56) References Cited

U.S. PATENT DOCUMENTS

| | | | |
|---|---|---|---|
| 6,411,605 B1 * | 6/2002 | Vance et al. ............. | 370/261 |
| 6,556,586 B1 | 4/2003 | Sipila | |
| 6,658,093 B1 | 12/2003 | Langseth et al. | |
| 7,072,359 B2 | 7/2006 | Uchida et al. | |
| 7,653,193 B2 * | 1/2010 | Pfleging et al. ........ | 379/205.01 |
| 2003/0053612 A1 * | 3/2003 | Henrikson et al. ..... | 379/202.01 |
| 2003/0224811 A1 | 12/2003 | Jain et al. | |
| 2005/0018826 A1 * | 1/2005 | Benco et al. ........... | 379/202.01 |
| 2005/0027608 A1 | 2/2005 | Wiesmuller et al. | |
| 2005/0078612 A1 * | 4/2005 | Lang ..................... | 370/260 |
| 2005/0227680 A1 * | 10/2005 | Snowden ................ | 455/416 |
| 2006/0234734 A1 | 10/2006 | Kim | |
| 2007/0094661 A1 * | 4/2007 | Baird et al. ............. | 718/102 |

FOREIGN PATENT DOCUMENTS

CA 2522881 A1 * 4/2007

* cited by examiner

*Primary Examiner*—Marivelisse Santiago-Cordero
(74) *Attorney, Agent, or Firm*—Schmeiser, Olsen & Watts; William H. Steinberg

(57) ABSTRACT

The invention enhances mobile device software such that upon receipt of a specially formatted SMS message, the software can automatically dial a telephone number that was specified in the message after a configurable timed interval. A further enhancement comprises improvements to the integration between collaboration software (such as Lotus Notes) and mobile device software to enable employees to utilize this invention for connecting to conference calls. During the method of the present invention, a potentially contentious situation is detected. After this detection, this method, disrupts the capability of the system to automatically connect the user to a previously scheduled telephone conference, and notifies the user and querying the user and giving the user options to determine how the user desires to handle the one or more incoming calls. The user options can depend on the particular situation detected.

16 Claims, 8 Drawing Sheets

METHOD AND SYSTEM FOR HANDLING POTENTIALLY CONTENTIOUS SITUATIONS UPON RECEIPT OF AN AUTOMATICALLY CONNECTING SMS MESSAGE

FIELD OF THE INVENTION

This invention relates to a method and system for conveying messages to a user related to previously scheduled events and in particular to a method and system for transmitting text messages to a user who is not using or in close proximity to a stationary or semi-stationary computing device. More particular, this invention relates to a method and system for handling multiple text messages transmitted to the user at approximately to the same time interval. The transmission being a text message sent to a mobile computing device that is possessed or that in close proximity to the user.

BACKGROUND OF THE INVENTION

Computer Supported Coorporative Work (CSCW) addresses "how collaborative activities and their coordination can be supported by means of computer systems." On the one hand, many authors consider that CSCW and groupware are synonyms. CSCW is a generic term, which combines the understanding of the way people work in groups with the enabling technologies of computer networking, and associated hardware, software, services and techniques. Groupware can be divided into three categories depending on the level of collaboration—communication tools, conferencing tools and collaborative management (Co-ordination) tools. Electronic communication tools send messages, files, data, or documents between people and hence facilitate the sharing of information. Examples include: email, instant messaging, faxing, voice mail and web publishing. Electronic conferencing tools facilitate the sharing of information, but in a more interactive way. Examples include: Internet forums (also known as message boards or discussion boards)—a virtual discussion platform to facilitate and manage online text messages;

Chatting—a virtual discussion platform to facilitate and manage real-time text messages;

Telephony—telephones allow users to interact;

Video conferencing—networked PCs share video and audio signals;

Data conferencing—networked PCs share a common whiteboard that each user can modify;

Application sharing—users can access a shared document or application from their respective computers simultaneously in real time; Electronic meeting systems (EMS)—a conferencing system built into a room. The special purpose room will usually contain a large video projector interlinked with numerous PCs.

Collaborative management tools facilitate and manage group activities. Examples include: electronic calendars (also called time management software)—schedule events and automatically notify and remind group members; project management systems—schedule, track, and chart the steps in a project as it is being completed; workflow systems—collaborative management of tasks and documents within a knowledge-based business process; knowledge management systems—collect, organize, manage, and share various forms of information; extranet systems (sometimes also known as 'project extranets')—collect, organize, manage and share information associated with the delivery of a project (eg: the construction of a building); social software systems—organize social relations of groups; online spreadsheets—collaborate and share structured data and information. Collaborative software can be either web based (such as UseModWiki or Scoop), or desktop systems (such as CVS or RCS).

A conference call is a telephone call where the calling party wants to have more than one called party listen in to the audio portion of the call. The conference call may be designed to allow the called party to also talk during the call, or the call may be set up so that the called party merely listens into the call but cannot speak. It is often referred to as an ATC (Audio Tele-Conference). These conference calls are a convenient way for many people to conduct business affairs while being in different physical locations. Even the technology for conference calls has progressed to the point that many users have systems that remind them of scheduled calls and prompt them immediately before a scheduled telephone conference is to occur. Some of these conference notification systems automatically remind the user of a scheduled teleconference.

At certain times, the currently available reminder capability for conference calls or other meetings in collaboration tools (such as Lotus Notes) are insufficient. The basic problem is that they require the user to be using the computer or be near it, in order to be alerted about an upcoming meeting. Consider the following cases where that requirement is problematic for obtaining the alert:

The user has left his/her laptop locked in an office and is collaborating with fellow coworkers on the design of some new architecture in a conference room. Or, as another example, the user is attending a department celebration such as a major project delivery or a coworker retirement, etc. in a conference room and has left his/her laptop in an office.

The user may have been stopped in the hallway and asked about a solution to some problem, and as a result of the ensuing discussion, may have forgotten about an upcoming meeting.

In the user's current time zone, the meeting is scheduled for early afternoon, but because the user has flown to another location to work on another project, the meeting may occur while the user is out at lunch in the new time zone, or early in the morning while the user is still getting dressed for work.

The user may be in a taxi on the way to/from an airport or may be in some other capacity where he/she is not likely to have a laptop open. While the user may not want to take a confidential call in these instances, there are non-confidential calls and non-participatory calls that the user might want to take in these instances, such as an overview of the new features and advantages of a recently released software product from IBM, for example.

These scenarios highlight the problems associated with notifying a user of a conference call when that user is away from his/her computer.

In addition, there may a situation when the user has two teleconferences that are scheduled at approximately the same time. The user would need some way to prioritize the receipt of these calls. In still other cases, an emergency situation may have developed and the user may not be able or want to automatically connect to the call at the scheduled time. There remains a need for a means to connect to or be reminded of a conference call or meeting while the user is away from his/her computer. There remains a further need for a method and system that can handle multiple calls coming to the user at approximately the same time.

SUMMARY OF THE INVENTION

The present invention provides a method and system that sends text messages to users via mobile devices when the user is away from his/her office or main computer device. The invention comprises an enhancement to mobile device (cell phone, BlackBerry, Palm Pilot, etc.) software and an enhancement to collaboration tool (such as Lotus Notes) software for the integration of this new feature. The invention provides the option for the user to be notified by SMS on a mobile device of an upcoming conference call/meeting. However, because it is designed to alleviate the problems above where the user is away from the computer, the invention also allows the conference call number and pass code (if required) to be sent as part of the SMS message, and the mobile device software to be enhanced as to provide the following option:

Upon receipt of one of these messages, the enhanced mobile device software would automatically connect to the specified conference call number after some preconfigured time interval, for example 15 seconds. This time interval would be one of the preference settings for the mobile device software.

In the method of the present invention, there is an initial system setup. This step involves the sending of a test message to determine whether the user's portable device can receive text messages in this system. Once the initial setup is complete, the user device is then capable of receiving text messages related to scheduled telephone conferences. A second step is to input into the system the telephone conference schedule, which can include any travel plans of the user. The third step would be to send the meeting text message notification at the appropriate time to the user via the user's mobile device such as the user's PDA or cellular telephone device. If various situations occur such as the user receiving two text messages in close proximity to each other, the user being currently on a call when the message comes in, or the user being involved in an urgent matter at the time of the receipt of the message, then method of the present invention enables the user to manually intervene. This invention method detects the contentious situation, disrupting the capability of the system to automatically connect the user to a previously scheduled telephone conference, and notifying the user and querying the user and giving the user options to determine how the user desires to handle the one or more incoming calls. The user options can depend on the particular situation detected.

The mobile electronic device used to receive SMS messages in the present invention can be equipped with a new and differential icon (different color, different shape, etc) that alerts the user that an incoming message is an enhanced reminder. In addition, there can be different alert modes (flashing icon or different color) that can identity to the user a particular contentious situation such as multiple messages at approximately the same time period.

DETAILED DESCRIPTION OF THE INVENTION

The present invention incorporates Short Message Service technology to enable a user to receive information in a text message format. Short Message Service (SMS) is a service available on most digital mobile phones (and other mobile devices, e.g. a Pocket PC, or occasionally even desktop computers) that permits the sending of short messages (also known as text messages, or more colloquially SMSes, texts or even txts) between mobile telephones, other handheld devices and even landline telephones.

Messages are sent to a Short Message Service Centre (SMSC) which provides a store-and-forward mechanism. It attempts to send messages to their recipients. If a recipient is not reachable, the SMSC queues the message for later retry. Some SMSCs also provide a "forward and forget" option where transmission is tried only once. Both Mobile Terminated (MT), for messages sent to a mobile handset, and Mobile Originating (MO), for those that are sent from the mobile handset, operations are supported. Message delivery is best effort, so there are no guarantees that a message will actually be delivered to its recipient and delay or complete loss of a message is not uncommon, particularly when sending between networks. Users may choose to request delivery reports, which can provide positive confirmation that the message has reached the intended recipient, but notifications for failed deliveries are unreliable at best.

Transmission of the short messages between SMSC and phone can be done through different protocols such as SS7 within the standard GSM MAP framework or TCP/IP within the same standard. Messages are sent with the additional MAP operation forward_short_message, whose payload length is limited by the constraints of the signaling protocol to precisely 140 bytes (140 bytes=140*8 bits=1120 bits). In practice, this translates to either 160 7-bit characters, 140 8-bit characters, or 70 16-bit characters.

Figure 1:
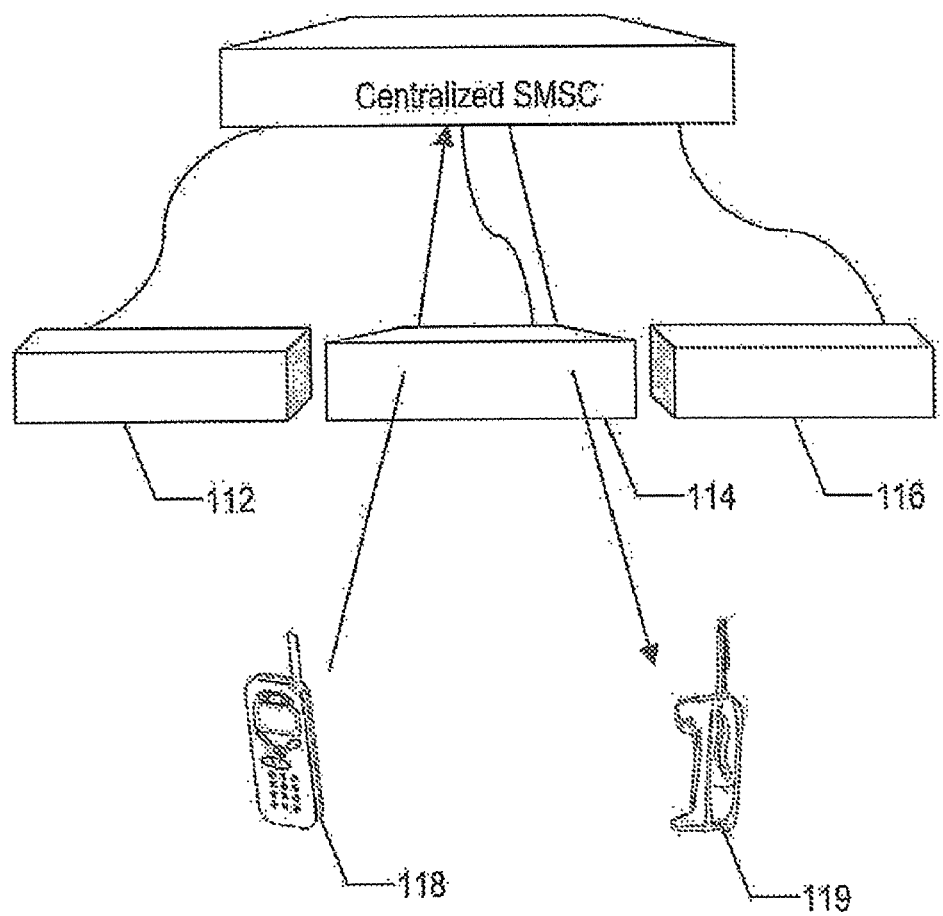
FIG. 1 is an illustration of a Short Message System (SMS) capable of sending text messages to a mobile device.

FIG. 1 is an illustration of a typical Short Message System (SMS) configuration capable of sending text messages to a mobile device. This configuration comprises a centralized control center SMSC 110, control towers 112, 114, and 116, and the mobile electronic devices 118 and 119 possessed by the end user. In addition to these electronic mobile devices other computing devices such as personal computers (PCs) and laptop computers are capable of sending and receiving text messages via the SMS technology. In the SMS, the user will formulate and send the message through electronic device 118. This message travels through a channel to the control tower 114 that is the closest in proximity to the electronic device 118. The message is then sent from the control tower 114 to the central control center SMSC 110. The SMSC stores the message and transmits the message via control tower 114 to the recipient electronic device 119. In this example, because of the location of the both electronic devices, control tower 114 interacted with devices 118 and 119. However, in other cases different control towers will be used to transmit and receive messages.

Figure 2:
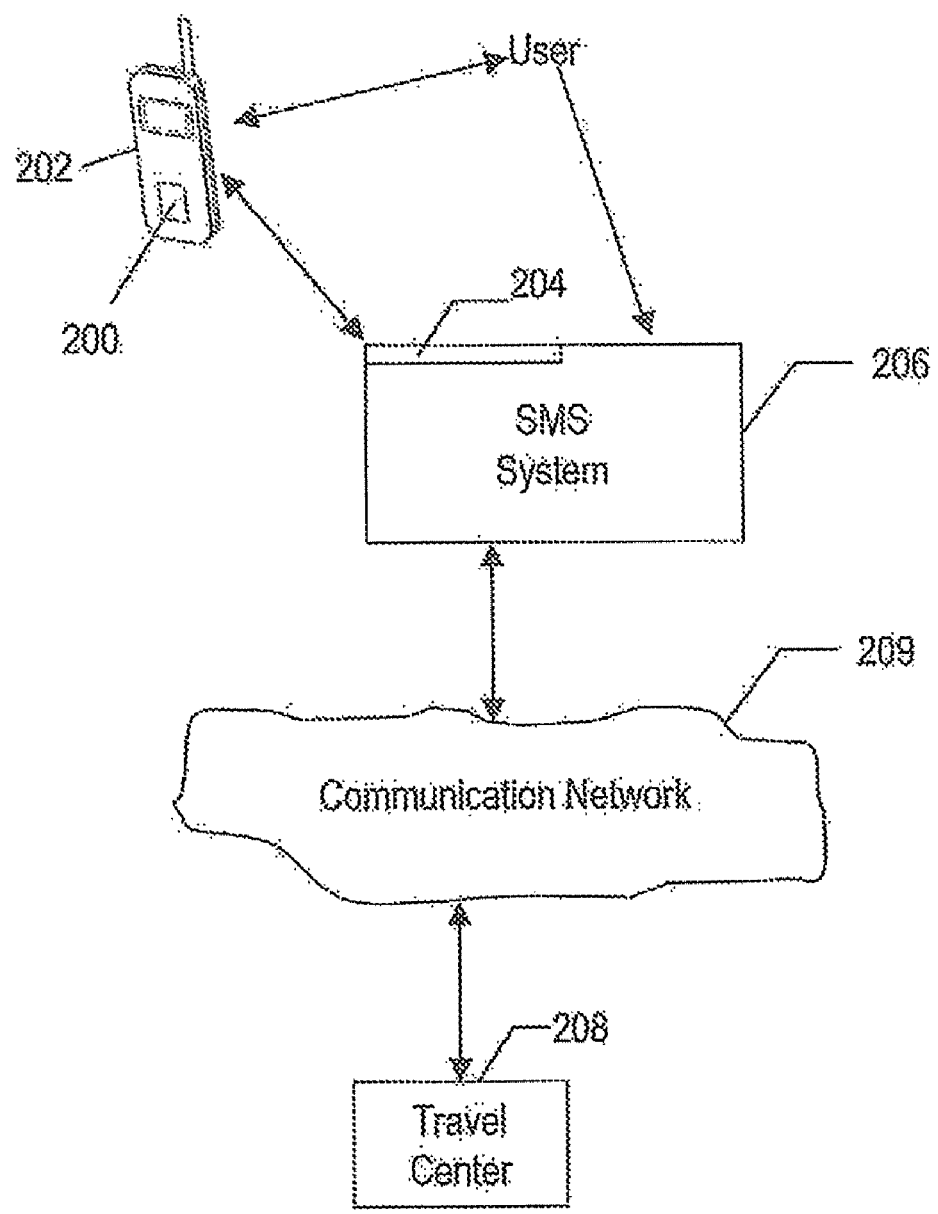
FIG. 2 is an illustration of a configuration of the system of the present invention.

FIG. 2 illustrates a configuration of the telephone conference notification and connection system of the present invention. The invention comprises a software enhancement 200 to software 202 in a mobile device (cell phone, BlackBerry, Palm Pilot, etc.) and an enhancement 204 to collaboration tool (such as Lotus Notes) software 206 for the integration of this new feature. In this system, the collaboration tool 206 communicates with the mobile device 202 for the transmission and receipt of text messages at the mobile device. A user interfaces with both the mobile device and the collaboration tool. In addition, a travel center 208 can be incorporated to provide information about the itinerary of the user. Communication between the travel center and the collaboration tool can be through a communication network 209 such as the Internet or a telephone system. The mobile device can have a display screen to show any received text messages.

However, some mobile devices do not have the capability to automatically show the SMS message when it is received, but instead shows an icon and the user has to enter the "Text Messaging" category of the device in order to view the message. For these telephones, the present invention has two enhancements: 1) A new and differential icon (different color, different shape, etc.) that alerts the user that the incoming message is an enhanced reminder message; and 2) The ability for the differentiated icon to provide a number next to it (either superscript or subscript) in the event the mobile device receives multiple enhanced reminders at the same time. The user will then have to choose which call to connect to when he/she enters the "Text Messaging" category.

The present invention provides a method for automatically connecting users to telephone conference calls. In addition, this method provides the feature of notifying a user when there is change in a scheduled conference call. This change may be the result of activities of the user. The invention provides the option for the user to be notified by SMS on a mobile device of an upcoming conference call/meeting. However, because it is designed to alleviate the problems above where the user is away from the computer, the invention also allows the conference call number and pass code (if required) to be sent as part of the SMS message, and the mobile device software to be enhanced as to provide the following option:

Upon receipt of one of these messages, the enhanced mobile device software would automatically connect to the specified conference call number after some preconfigured time interval, for example 15 seconds. This time interval would be one of the preference settings for the mobile device software.

An additional enhancement provides the integration of the collaboration tool with an employee online travel reservation tool available in many company travel centers (CTC). With this integration, the collaboration tool, upon acceptance of a received meeting invite by the user or after the user has created a new appointment in the calendar, can prompt the user if he/she would like the enhanced reminder.

Figure 3:
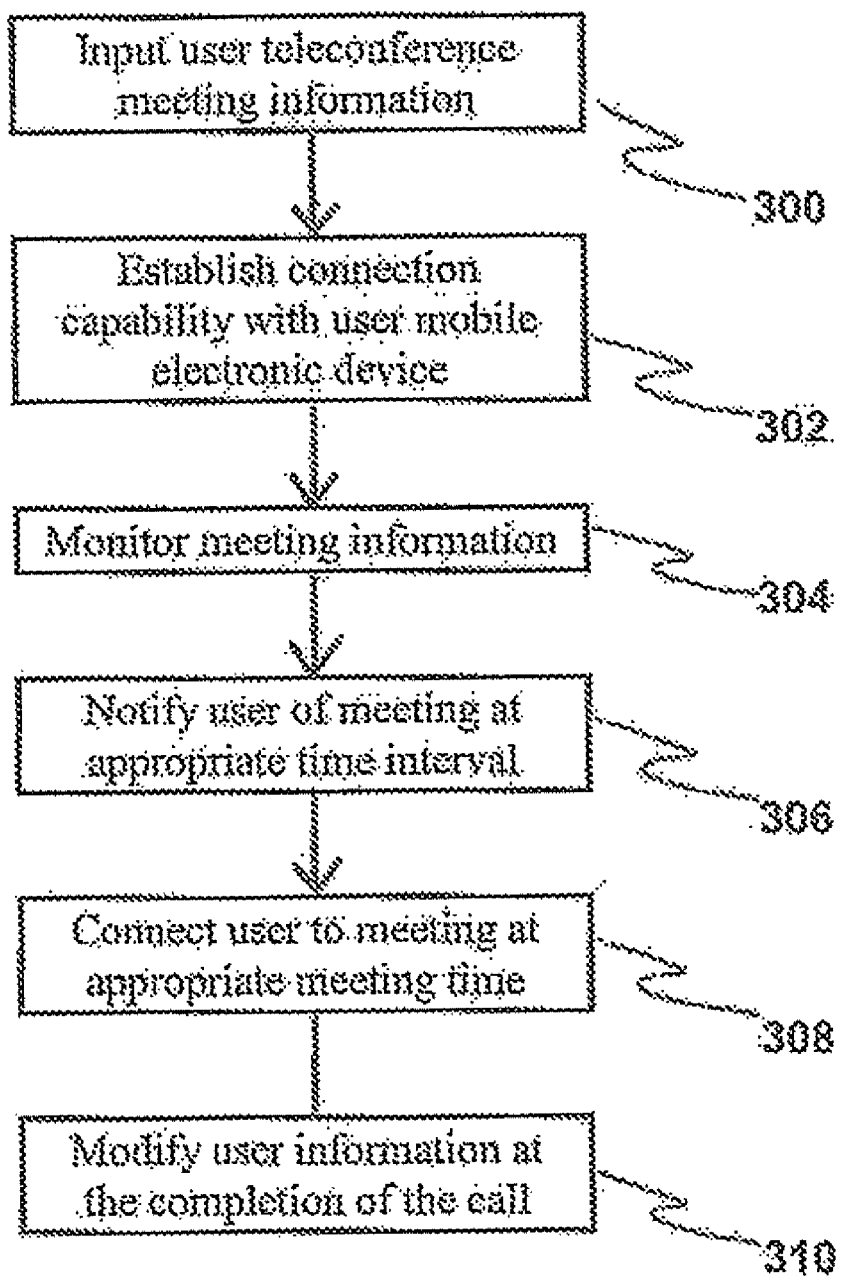
FIG. 3 is a flow diagram of the steps in the implementation of the method of the present invention.

FIG. 3 is a flow diagram of the steps in the implementation of the method of the present invention. The initial step 300 in this method is the receipt of user teleconference meeting information by the enhanced SMS message storage location such that enhanced SMS software can have access to this information. This location can be in at remote site (at an office facility) or at a network location (on a network server machine). The next step 302 in the method is to verify the capability to establish a connection with a user's mobile electronic device. This connection capability is between the mobile electronic device, the centralized SMSC and the location housing the enhanced software. In some configurations, this location can be the SMSC. The purpose of this step is primarily to ensure that the message can be sent to the mobile electronic device. Following the connection verification step, the method goes into a monitoring state, step 304. In this monitoring step, the method can periodically check for any previously submitted events or new events that may affect a scheduled event/meeting. For example, the meeting may be canceled or postponed. This information would be used to modify the notification time to the user. During the monitoring step, if the time for a scheduled event is detected, step 306 notifies the user as previously established. Step 308 then automatically establishes a connection of the user's mobile device to the conference at the scheduled time. Step 310 modifies information in the user file. This modification can be during the call or at the completion of the call.

Step 300 calls for the user to provide information about the user itinerary that the system will use to notify the user about an upcoming meeting or conference. Table 1 below is an example of an enhanced SMS Messaging Form, which the user will complete. This table of information is submitted to a software-monitoring program for the purpose of tracking information related to a user's travel schedule. This forms enables a user to provide what, when and where information about the user's activities to the Enhanced SMS software. This information is contained in a stored file for that particular user. As shown, this form is in a table format and can contain various types of information. This table contains four columns. The first column identifies a variable. The second column defines each variable. The data type for each variable is listed in the third column. Finally, the fourth column lists a default value for each variable.

Enhanced SMS Messing Form Variables

| Variable | Definition | Type | Default Value |
| --- | --- | --- | --- |
| Automatic Dial | When received on the mobile device should the number automatically be dialed? | Boolean | None must be selected by the user. |
| Automatic Dial Timed Interval | How long after message is received should mobile device attempt to connect to call? | Long (defined in seconds) | 15. Can be selected by the user. Only applicable if automatic dial option was chosen. |

-continued

| Variable | Definition | Type | Default Value |
|---|---|---|---|
| Test Message Option | Should a test message be sent to the mobile device for validation purposes? | Boolean | No |
| Message Title | A title for the message which will be displayed on the mobile device when the message is received. | String | The title of the meeting notice. Can be selected by the user. |
| Message Description | The message to be sent to the mobile device. | String | None must be selected by the user. |
| Connection ID (Conference calling number | Number to be dialed | Long | None must be selected by the user. |
| Connection Password (pass code) | The password for the meeting | String | Obtained from meeting invite, if available. |
| Time | Date and time message should be sent | Date | None must be selected by the user or calendaring tool. |
| Destination Cellular number | Destination device ID (telephone number or other device identification). | String | None must be selected by the user. |

Figure 4:
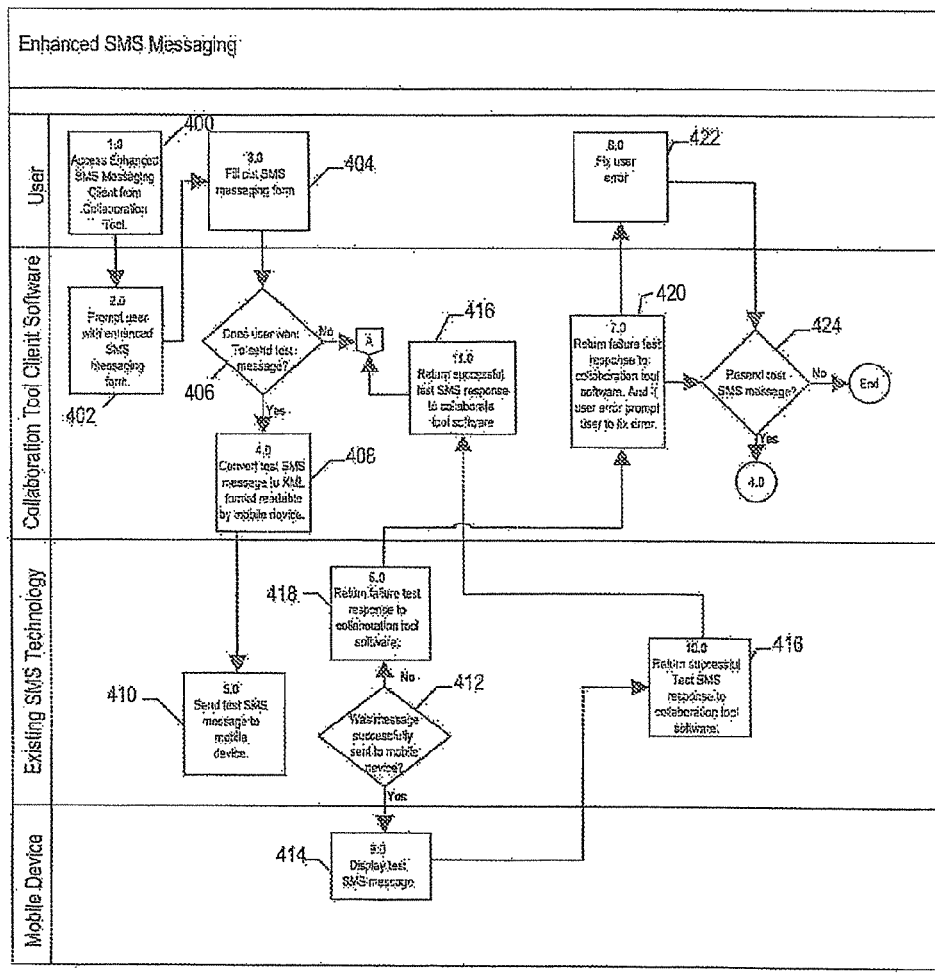
FIG. 4 is a flow diagram of the process for sending an SMS message to a mobile device in the method of the present invention.
Figure 5:
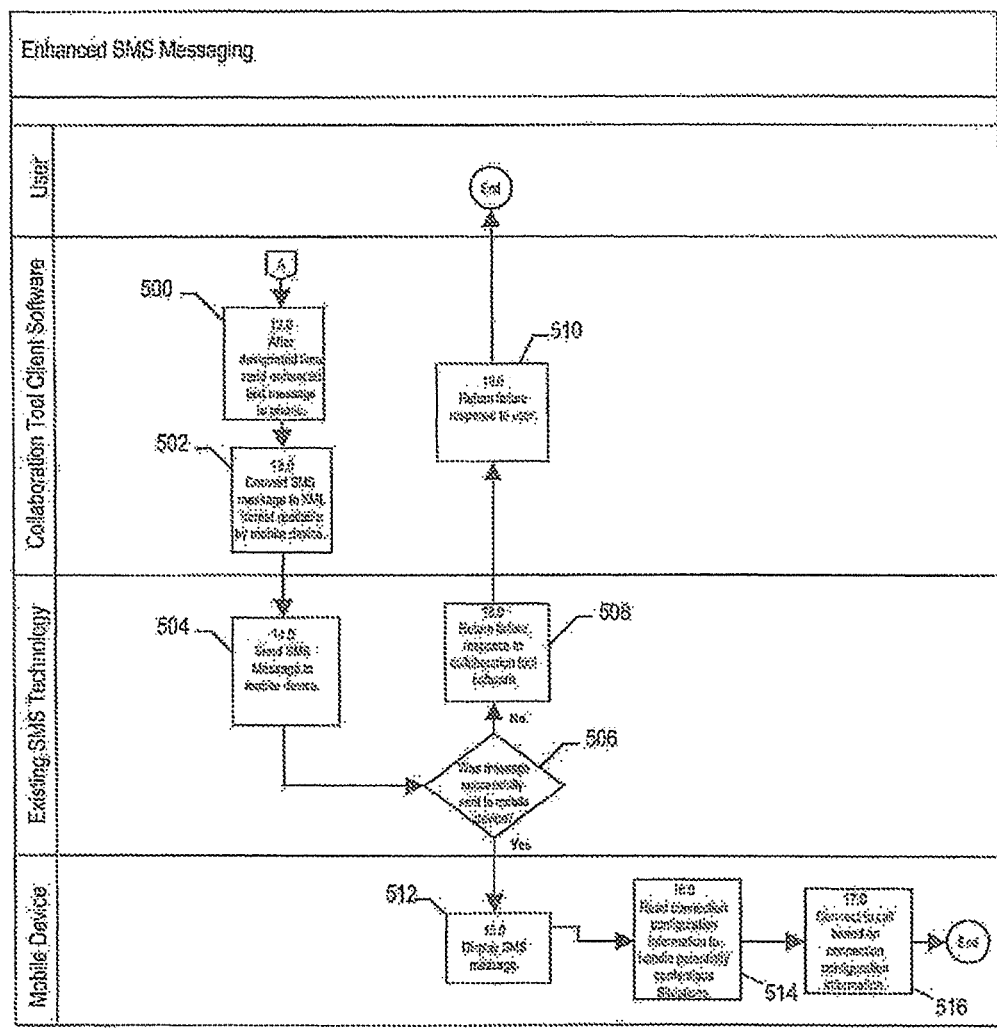
FIG. 5 is a flow diagram of the process for receiving an SMS message at a mobile device in accordance with the method of the present invention.

FIGS. 4 and 5 illustrate the automatic call connection capability of the present invention. Referring again to FIG. 3, step 302 verifies the capability of connecting to a user mobile electronic device. FIG. 4 is a detailed description of this step 302. In the initial step 400, the collaboration tool attempts to access the enhanced SMS Messaging software of the mobile electronic device. Step 402 prompts the user with an enhanced SMS messaging form. This prompt serves to get the user's attention and to alert them to fill out the SMS messaging form in step 404. This process of filling out the SMS messaging form can be an interactive process where the user is prompted to supply information in the requested/necessary fields. Once the user completes the SMS messaging form, the information in this form is stored in a file for that user. Next, the user has the opportunity to send a test message in step 406. If the user does not want to send a test message, the user can indicate this and the process would move to a monitoring and message receipt phase, which is shown in FIG. 5. If the user desires to send a test message, the process moves to step 408 where the SMS test message is converted to an XML format that is readable by the mobile electronic device. In step 410, this converted message is sent as an SMS test message to the mobile device.

At this point, in step 412, there is a determination of whether the test message was successfully sent to the mobile device. If the transmission was successful, the SMS test message is displayed on the electronic device in step 414. At this point, step 416 sends a return successful test SMS response to the collaboration tool software. Since the test message transmission was successful, the process moves to the monitoring state.

Referring again to step 412, if the test message transmission was not successful, a test failure message is generated and sent to the collaboration tool software in step 418. Next step 420 determines whether the error is a user error. If so, the user is prompted to correct the error. In step 422, the user corrects the error. If the determination is that the user has not made an error, or even if the user has made an error, in either case step 424 determines whether or not to reseed the test message.

Referring to step 306, FIG. 5 is a flow diagram of the process for receiving an SMS message at a mobile device in accordance with the method of the present invention. This method in FIG. 5 is a continuation of the method described in FIG. 4. This method of FIG. 5 continues from either step 406 or 416. Both of these steps return successful test SMS responses to the collaboration tool software. In the method of FIG. 5, after a designated time, an enhanced text message is generated to send to the user's mobile electronic device. This message can be any time designated by the user and prior to a scheduled conference. For example, the user may want a reminder of a meeting at 30 minutes prior to the meeting. At the 30 minutes point prior to the meeting, a text message in step 500 would be generated to go out the user's mobile device. Step 502 would convert the transmitted SMS message to an XML format that is readable by the user's mobile device. After the message conversion, step 504 would actually send the SMS message to the user's mobile device.

Once the message is sent, step 506 makes a determination of whether the message was successfully sent to the user's mobile device. If the determination is that the message transmission was not successful, the method moves to step 508 where a return failure response is sent to the collaboration tool software. This failure response message is then sent to the user in step 510 and the process ends.

Referring again to step 506, if the determination is that the message was successfully sent, step 512 displays this message at the user device. In addition to displaying an SMS text message at the user device, the present invention can have the capability to determine in step 514 whether there are multiple messages being simultaneously transmitted to the user device. When there are multiple messages awaiting the user, in step 516 a connection is made to one of the messages.

This selection can be based on the user's discretion or there can be some predetermined method for making the connection. In one situation when the mobile device has received a message to automatically connect to a call while the user is currently on a call (FIG. 6), again, the software will not try to connect to the telephone number. In this case, the software would switch over to a manual mode for the SMS message, thereby giving the user the option to use a one-click option to connect to the call later on if he/she so desires.

Another approach could be in the event the mobile device has received multiple SMS messages (FIG. 7) to automatically connect to a call at overlapping times, the software will not try to connect to any of the telephone numbers. Instead the software will alert the user of this situation and prompt the user to select which call to which the user wants to connect. In this approach, the user gets the option to select the call. One example of the predetermined approach could be message priority system.

In the event the user has received a message to automatically connect to a call, but it comes at an inopportune time (FIG. 8) the user can choose to cancel the automatic call process before the time interval has expired. For example, if the user is already in a meeting, the user can cancel the automatic connect before this automatic connect occurs. If the meeting in the collaboration tool gets canceled before the SMS message has been sent, it will not send the SMS message.

Figure 6:
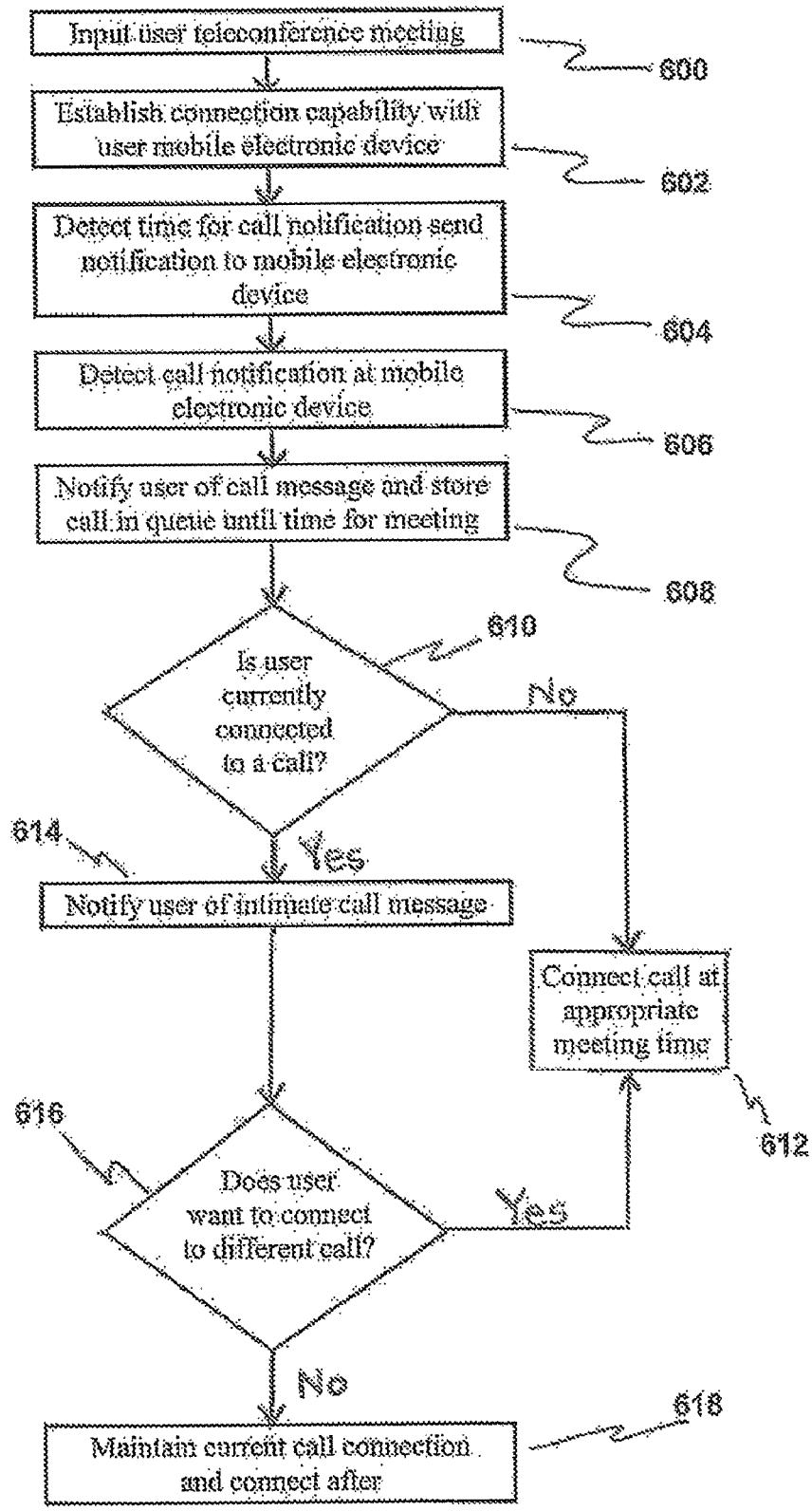
FIG. 6 is a flow diagram of the steps in the implementation of the method of the present invention when a user that may be currently connected to another call receives an SMS message.

FIG. 6 is a flow diagram of the steps in the implementation of the method of the present invention when a user that may be currently connected to another call receives an SMS message. In step 600, the user inputs information to the system related to a scheduled teleconference meeting. The above-described chart illustrates the type of information a user would input into the system. The next step 602 in the method is to verify the capability to establish a connection with a user's mobile electronic device. This step is the same as the previously described step 302. In step 604, the schedule time to notify the user is detected and an SMS message is transmitted to the remote device of the user. At the mobile electronic device, step 606 detects and receives the transmitted SMS message. In step 608, the user's mobile device notifies the user of the received SMS text message related to a meeting. This notification can be flashing icon light or a sound or other conventional notification method. The received message is also stored in a queue in the mobile electronic device. At the time of the scheduled meeting, step 610 determines whether the user is currently connected to another call. If the user is not currently connected to another call, then step 612 connects the user's electronic mobile device to the scheduled teleconference.

Referring again to step 610, if the user is currently connected to a call, the method moves to step 616 where the user is again notified in step 614 of the pending conference call and is prompted in step 616 to indicate whether to connect to the call or whether to continue the connection with the current call. If the user indicates the desire to connect to the incoming call, the current user connection is terminated (either automatically or by the user) and a connection is automatically established with the scheduled teleconference in step 612. If the user indicates a desire to remain connected to the current call, there can be an option in step 618 for the user to connect to the conference related to the incoming call at the conclusion of the user's current call.

Figure 7:
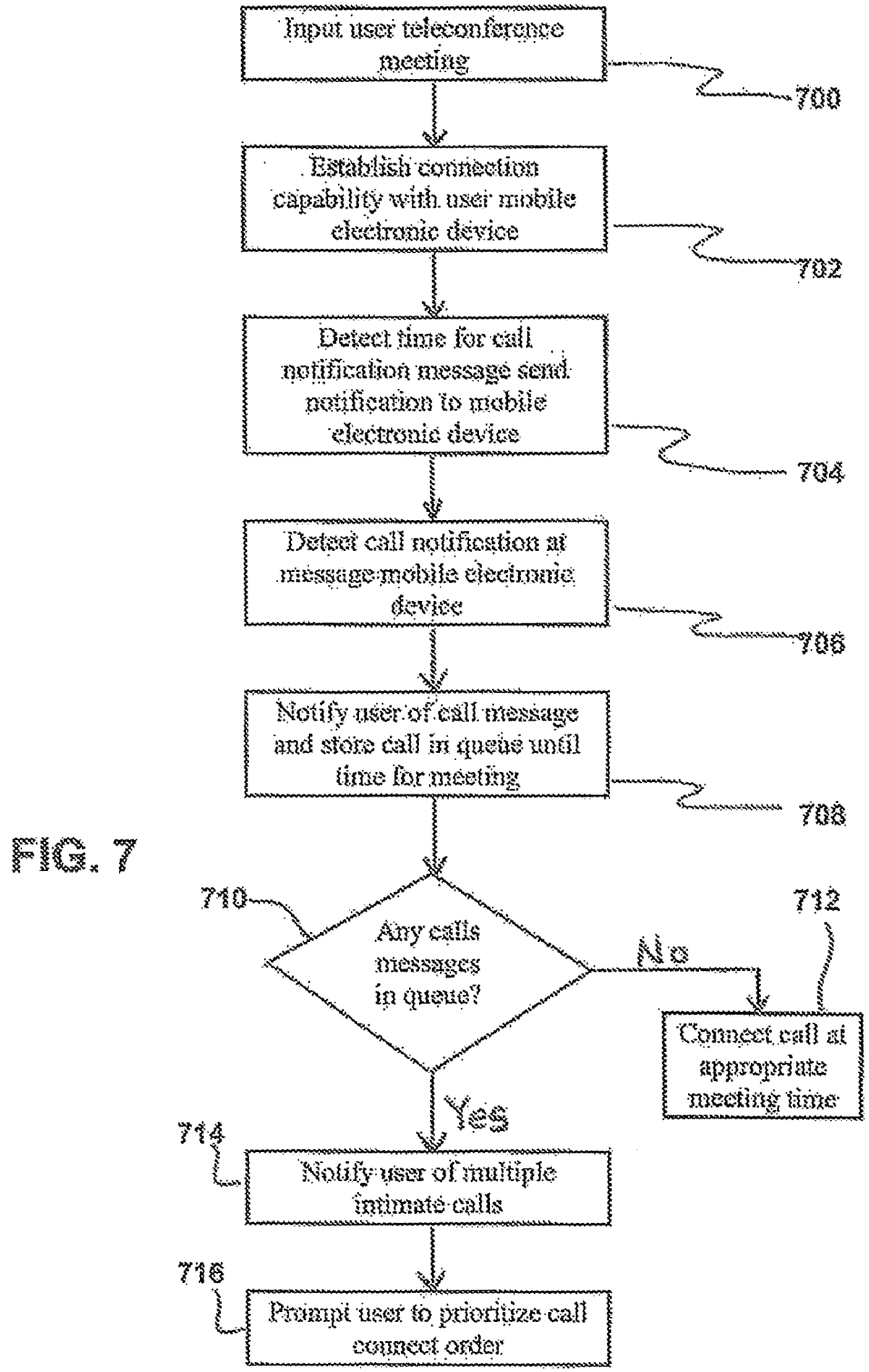
FIG. 7 is a flow diagram of the steps in the implementation of the method of the present invention when a user may receive multiple SMS messages at approximately the same time.

FIG. 7 is a flow diagram of the steps in the implementation of the method of the present invention when a user may receive multiple SMS messages at approximately the same time. For this method, the initial steps of inputting user teleconference information (700), establishing a connection capability (702), detecting the time for a call notification message and sending the message to a mobile electronic device (704), detecting the call notification message at the mobile electronic device (706) and notifying the user of a call message are the same as the corresponding steps 600, 602, 604, 606 and 608 of FIG. 6 respectively. At this point in the method, the user has been notified of an upcoming conference call. As mentioned in this system, the user is automatically connected to the conference. After a received call has been placed in a queue, step 710 makes a determination of whether there are other received calls that have been previously stored in the queue. Any stored calls in the queue represent other pending teleconferences for this user. If there are no other call messages in the queue, then at the time of the teleconference related to the received call, step 712 connects the user to the call. However, if there is determination that there are other messages in the queue, then there is a message conflict. In this case, step 714 notifies the user of the multiple call messages. In step 716, the user is prompted to give a selection or priority for the call messages.

Figure 8:
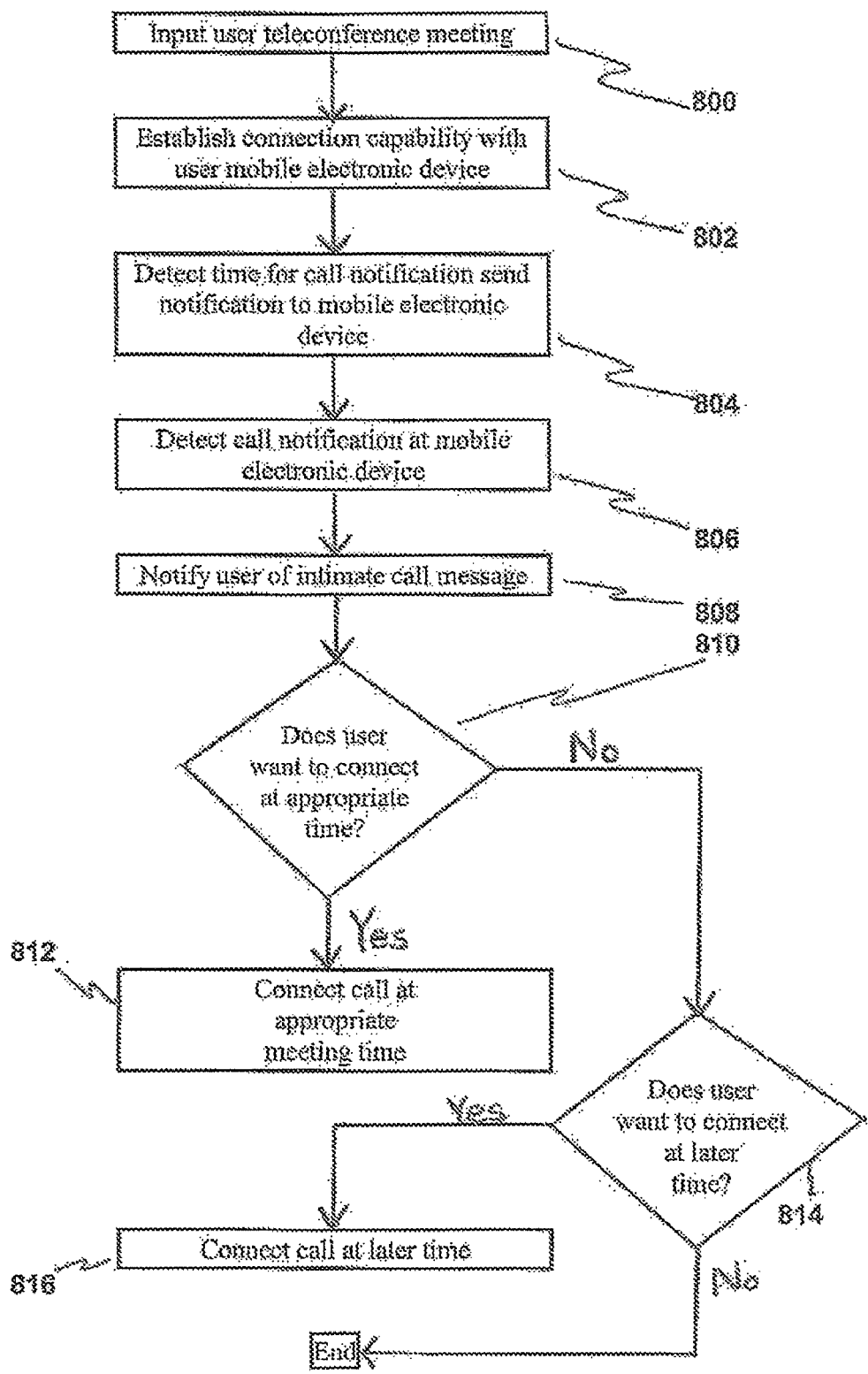
FIG. 8 is a flow diagram of the steps in the implementation of the method of the present invention when a user that may not be able to or want to connect to a call at the previously scheduled time for that call.

FIG. 8 is a flow diagram of the steps in the implementation of the method of the present invention when a user that may not be able to or want to connect to a call at the previously scheduled time for that call. As with FIG. 7, in the method illustrated in FIG. 8, the initial steps of inputting user teleconference information (800), establishing a connection capability (802), detecting the time for a call notification message and sending the message to a mobile electronic device (804), detecting the call notification message at the mobile electronic device (806) and notifying the user of a call message (808) are the same as the corresponding steps 600, 602, 604, 606 and 608 of FIG. 6.

Referring to FIG. 8, after the user is notified of an upcoming telephone conference, step 810 makes a determination of whether the define time for the call is still an appropriate time. This determination can be accomplished by querying the user with a prompt for the user to answer this availability question. If the user responds and desires to make the connection to the conference, in step 812, the user is automatically connected to the conference call at the appropriate time of the conference. If in step 810, there may be some emergency or other situation that has occurred to cause the user to not want to connect to the conference at the previously identified time. In this case, the process moves to step 814, which determines whether the user wants to connect to the conference at a later time in the conference. If the conference has not yet ended, in step 816, the user is connected to the conference at a later determined time.

As discussed, the present invention provides novel features over conventional methods of performing text message functions and conventional methods for alerting persons of upcoming telephone conferences. First, this invention has an automated calling after a timed interval. Second, this invention incorporates the use of a new icon with multiplicity factor for phones that use icons to denote new text messages. The new icon would be used to tell the user that this message is a conference call message, as opposed to a message received from a friend. Third, this invention can be integrated with a travel reservation system to detect when the user might want this type of reminder (with the automated calling, or a text alert in general). This would essentially replace box 402 in FIG. 4, so that instead of prompting the user every time if they want the SMS reminder, it would only prompt them when it detects that they would likely be away from their machine at the time of the meeting (if the meeting falls at lunchtime in the new time zone, for example). Note that the user can configure the frequency that the collaboration tool pulls data from the online travel reservation tool, such as nightly, weekly, monthly, etc., according to how often the employee travels. With these novel features, the present invention provides several advantages:

Solves the drawbacks/limitations outlined above with current reminder functionality in collaboration tools.
  It's unique. While the ability to send an SMS reminder message currently exists, we have not found the ability to trigger an action on the mobile device upon receipt of an SMS message. In the case of this application, the action would be to automatically connect to the call after some time interval.

Additionally, we have not seen the integration of a collaboration tool with an online travel reservation tool in the manner specified above.

Buildable—it's relatively easy for one skilled in the art of mobile device software to implement the two options above upon receipt of an SMS message. The integration with the reservation system should be likewise straightforward.

An excellent usability enhancement, as it makes it very convenient for the user to connect to the call while away from the computer.

While this detailed description of the invention focuses on a method for automatically connecting to conference calls, there is a broader application and concept of triggering an action on a mobile device upon receipt of an SMS message. A number of follow-on ideas flow from this concept that are also useful. For example, a user may ask his/her friend for the phone number of a third mutual contact via SMS. Upon receipt of the phone number, the mobile device software can be enhanced to detect that a phone number is included in the message and can prompt to connect or automatically connect to the call. It can also prompt the user to store the number if it detects that the number is not already in the contact list. In another example, a user may have read an article that he/she thinks may be interesting to a friend and hence has forwarded it to the friend. Upon receipt of the message, the mobile device software either prompts to connect to the Web on the mobile device or automatically does so after a configured interval.

It is important to note that while the present invention has been described in the context of a fully functioning data processing system, those skilled in the art will appreciate that the processes of the present invention are performed by execution of instructions by the fully functioning data processing system. The instructions are capable of being stored in a computer readable storage medium in a computer program product. Examples of computer readable storage media include EPROM, ROM, magnetic tape, floppy disc, hard disk drive, RAM, and CD-ROMs.

We claim:

1. A method for handling potentially contentious situations upon receipt of a Short Message System (SMS) message when connecting users to conference calls, said method comprising:

a network server machine receiving user meeting notification parameters from a mobile electronic device of a user, said user meeting notification parameters being received at a data storage location of the network server machine, said user meeting notification parameters pertaining to a scheduled conference call for a meeting among a calling party and a plurality of other parties, said conference call scheduled to occur at a scheduled meeting time for the meeting;

after said receiving the user meeting notification parameters, verifying a capability to establish a connection between the mobile electronic device and both the network server machine and a SMS center, said SMS center configured to receive and send messages from and to, respectively, the mobile electronic device via a control tower communicatively disposed between the mobile electronic device and the SMS center;

after said verifying, detecting an occurrence of the scheduled meeting time for the meeting;

responsive to said detecting, sending to the mobile electronic device a first SMS text message communicating to the user that the scheduled meeting time for the meeting has occurred, said sending the first SMS text message resulting in storage of the first SMS text message in a queue of the mobile electronic device;

after said sending the first SMS text message, determining that a connection conflict exists at the mobile electronic device, wherein the connection conflict is that: the user is currently connected to a first call via the mobile electronic device, there are other call messages in the queue, or the user does not want to connect to the conference call at the scheduled meeting time for the meeting; and responsive to said determining that the connection conflict exists, notifying the user of the connection conflict.

2. The method of claim 1, wherein the connection conflict is that the user is currently connected to the first call via the mobile electronic device, wherein said notifying the user of the connection conflict comprises:

sending the mobile electronic device a second SMS text message communicating that the scheduled meeting time for the meeting has occurred; and ascertaining whether the user wants to connect to the conference call or remain connected to the first call.

3. The method of claim 2, wherein said ascertaining comprises ascertaining that the user desires to connect to the conference call, and wherein the method further comprises:

responsive to said ascertaining, terminating the first call; and after said terminating, connecting the user to the conference call via the mobile electronic device.

4. The method of claim 2, wherein said ascertaining comprises ascertaining that the user desires to remain connected to the first call and to connect to the conference upon completing the first call, and wherein the method further comprises:

responsive to said ascertaining, continuing to connect the user to the first call until completing the first call; and upon said completing the first call, connecting the user to the conference call via the mobile electronic device.

5. The method of claim 1, wherein the connection conflict is that there are other call messages in the queue, and wherein the method further comprises:

after said notifying the user of the connection conflict, prompting the user to prioritize the other call messages in an order of connection.

6. The method of claim 1, wherein the connection conflict is that the user does not want to connect to the conference call at the scheduled meeting time for the meeting, and wherein the method further comprises:

determining that the user wants to connect to the conference call at a later time that is later than the scheduled time; and connecting the user to the conference call at the later time.

7. The method of claim 1, wherein the method further comprises providing to the user a SMS messaging form and prompting the user to fill out the SMS messaging form by supplying information in fields of the SMS messaging form;

wherein said receiving the user meeting notification parameters comprises receiving from the mobile electronic device, in response to said prompting, the SMS messaging form as filled out with the supplied information that includes the user meeting notification parameters; and wherein the user meeting notification parameters include:

an Automatic Dial Timed Interval variable of type Long specifying how long after receiving the first SMS text message the mobile electronic device will call the conference call, a Message Title variable of type String specifying a title for notice of the meeting at the conference call such that the title is to be displayed on the mobile electronic device when the mobile electronic device receives the first SMS text message, and a Message Description variable of type String specifying message text for inclusion in the first SMS text message.

8. The method of claim 7, wherein the supplied information includes a Test Message Option variable of type Boolean specifying whether or not a test message is to be sent to the mobile electronic device for validation purposes.

9. A computer program product in a computer readable storage medium, said computer program product comprising instructions which upon being executed by a data processing system perform a method for handling potentially contentious situations upon receipt of a Short Message System (SMS) message when connecting users to conference calls, said method comprising:

a network server machine receiving user meeting notification parameters from a mobile electronic device of a user, said user meeting notification parameters being received at a data storage location of the network server machine, said user meeting notification parameters pertaining to a scheduled conference call for a meeting among a calling party and a plurality of other parties, said conference call scheduled to occur at a scheduled meeting time for the meeting;

after said receiving the user meeting notification parameters, verifying a capability to establish a connection between the mobile electronic device and both the network server machine and a SMS center, said SMS center configured to receive and send messages from and to, respectively, the mobile electronic device via a control tower communicatively disposed between the mobile electronic device and the SMS center;

after said verifying, detecting an occurrence of the scheduled meeting time for the meeting;

responsive to said detecting, sending to the mobile electronic device a first SMS text message communicating to the user that the scheduled meeting time for the meeting has occurred, said sending the first SMS text message resulting in storage of the first SMS text message in a queue of the mobile electronic device;

after said sending the first SMS text message, determining that a connection conflict exists at the mobile electronic device, wherein the connection conflict is that: the user is currently connected to a first call via the mobile electronic device, there are other call messages in the queue, or the user does not want to connect to the conference call at the scheduled meeting time for the meeting; and responsive to said determining that the connection conflict exists, notifying the user of the connection conflict.

10. The computer program product of claim 9, wherein the connection conflict is that there are other call messages in the queue, and wherein the method further comprises:

after said notifying the user of the connection conflict, prompting the user to prioritize the other call messages in an order of connection.

11. The computer program product of claim 9, wherein the connection conflict is that the user is currently connected to the first call via the mobile electronic device, wherein said notifying the user of the connection conflict comprises:

sending the mobile electronic device a second SMS text message communicating that the scheduled meeting time for the meeting has occurred; and ascertaining whether the user wants to connect to the conference call or remain connected to the first call.

12. The computer program product of claim 11, wherein said ascertaining comprises ascertaining that the user desires to connect to the conference call, and wherein the method further comprises:

responsive to said ascertaining, terminating the first call; and after said terminating, connecting the user to the conference call via the mobile electronic device.

13. The computer program product of claim 11, wherein said ascertaining comprises ascertaining that the user desires to remain connected to the first call and to connect to the conference upon completing the first call, and wherein the method further comprises:

responsive to said ascertaining, continuing to connect the user to the first call until completing the first call; and upon said completing the first call, connecting the user to the conference call via the mobile electronic device.

14. The computer program product of claim 9, wherein the connection conflict is that the user does not want to connect to the conference call at the scheduled meeting time for the meeting, and wherein the method further comprises:

determining that the user wants to connect to the conference call at a later time that is later than the scheduled time; and connecting the user to the conference call at the later time.

15. The computer program product of claim 9, wherein the method further comprises providing to the user a SMS messaging form and prompting the user to fill out the SMS messaging form by supplying information in fields of the SMS messaging form;

wherein said receiving the user meeting notification parameters comprises receiving from the mobile electronic device, in response to said prompting, the SMS messaging form as filled out with the supplied information that includes the user meeting notification parameters; and wherein the user meeting notification parameters include:

an Automatic Dial Timed Interval variable of type Long specifying how long after receiving the first SMS text message the mobile electronic device will call the conference call, a Message Title variable of type String specifying a title for notice of the meeting at the conference call such that the title is to be displayed on the mobile electronic device when the mobile electronic device receives the first SMS text message, and a Message Description variable of type String specifying message text for inclusion in the first SMS text message.

16. The computer program product of claim 15, wherein the supplied information includes a Test Message Option variable of type Boolean specifying whether or not a test message is to be sent to the mobile electronic device for validation purposes.

* * * * *